(12) United States Patent
Bayne et al.

(10) Patent No.: US 9,802,854 B2
(45) Date of Patent: Oct. 31, 2017

(54) MECHANICAL SCORING AND SEPARATION OF STRENGTHENED GLASS

(75) Inventors: John Frederick Bayne, Elmira, NY (US); James William Brown, Painted Post, NY (US); Michael Albert Joseph, II, Corning, NY (US); Siva Venkatachalam, Painted Post, NY (US); Sujanto Widjaja, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 851 days.

(21) Appl. No.: 13/050,281

(22) Filed: Mar. 17, 2011

(65) Prior Publication Data

US 2011/0226832 A1    Sep. 22, 2011

Related U.S. Application Data

(60) Provisional application No. 61/315,491, filed on Mar. 19, 2010.

(51) Int. Cl.
| | |
|---|---|
| *C03B 33/02* | (2006.01) |
| *B28D 5/00* | (2006.01) |
| *C03B 33/023* | (2006.01) |
| *C03B 33/033* | (2006.01) |
| *B26D 3/08* | (2006.01) |

(52) U.S. Cl.
CPC .............. *C03B 33/02* (2013.01); *B26D 3/085* (2013.01); *B28D 5/0011* (2013.01); *C03B 33/023* (2013.01); *C03B 33/033* (2013.01); *Y10T 83/0341* (2015.04); *Y10T 225/12* (2015.04); *Y10T 225/371* (2015.04)

(58) Field of Classification Search
CPC ..... C03B 33/02; C03B 33/033; C03B 33/023; B26D 3/085; B28D 5/0011; Y10T 225/12; Y10T 83/0341; Y10T 225/371
USPC ............ 83/863, 864, 56, 16, 13, 663; 225/2, 225/103, 96.5; 349/73
See application file for complete search history.

(56) References Cited

U.S. PATENT DOCUMENTS

| | | | | |
|---|---|---|---|---|
| 3,464,880 A | * | 9/1969 | Rinehart | 428/410 |
| 3,865,673 A | * | 2/1975 | DeTorre | 428/43 |

(Continued)

FOREIGN PATENT DOCUMENTS

| | | |
|---|---|---|
| CN | 1252390 | 5/2000 |
| CN | 1437018 A | 8/2003 |

(Continued)

OTHER PUBLICATIONS

Visiontek Systems Ltd., "Glass", Jun. 8, 2002, http://www.visionteksystems.co.uk/glass.htm.*

(Continued)

*Primary Examiner* — Jonathan Riley
(74) *Attorney, Agent, or Firm* — John T. Haran

(57) ABSTRACT

A strengthened glass sheet is separated into undamaged sheet segments by mechanically scribing one or more vent lines of controlled depth into the sheet surface, the depths of the scribed lines being insufficient to effect sheet separation, and then applying a uniform bending moment across the vent lines to effect separation into multiple sheet segments, the vent lines being scribed from crack initiation sites comprising surface indentations formed proximate to the edges of the glass sheet.

18 Claims, 4 Drawing Sheets

(56) References Cited

U.S. PATENT DOCUMENTS

| | | | |
|---|---|---|---|
| 3,880,337 A * | 4/1975 | Augustin et al. | 225/96.5 |
| 3,956,547 A | 5/1976 | DeTorre | |
| 3,959,000 A | 5/1976 | Nakagawa et al. | |
| 3,983,771 A * | 10/1976 | Bonaddio | B26D 3/085 83/425.3 |
| 4,057,184 A * | 11/1977 | Michalik | C03B 33/09 225/2 |
| 4,289,261 A | 9/1981 | Dahlberg | |
| 4,341,139 A | 7/1982 | DeTorre | |
| 4,427,143 A | 1/1984 | Hyatt | |
| 4,487,350 A | 12/1984 | DeTorre | |
| 5,016,800 A | 5/1991 | Sato et al. | |
| 5,038,654 A * | 8/1991 | Mackey | B26D 3/08 83/361 |
| 5,871,134 A | 2/1999 | Komagata et al. | |
| 6,222,604 B1 | 4/2001 | Suginoya et al. | |
| 6,402,004 B1 * | 6/2002 | Yoshikuni | C03B 33/033 225/104 |
| 6,412,677 B1 | 7/2002 | Yoshikuni et al. | |
| 6,818,576 B2 | 11/2004 | Ikenishi et al. | |
| 7,131,562 B2 | 11/2006 | Ueyama | |
| 7,439,665 B2 | 10/2008 | Wakayama | |
| 7,523,846 B2 | 4/2009 | Takamatsu | |
| 7,553,390 B2 | 6/2009 | Yamabuchi et al. | |
| 8,720,228 B2 * | 5/2014 | Li | 65/97 |
| 8,875,967 B2 * | 11/2014 | Bayne | B28D 5/0011 225/103 |
| 2002/0110706 A1 | 8/2002 | Miyamoto | |
| 2003/0194583 A1 | 10/2003 | Miyamoto | |
| 2004/0155085 A1 | 8/2004 | Takamatsu et al. | |
| 2004/0187659 A1 | 9/2004 | Nishiyama | |
| 2005/0032623 A1 | 2/2005 | Araujo et al. | |
| 2005/0056127 A1 | 3/2005 | Yamabuchi et al. | |
| 2005/0221044 A1 * | 10/2005 | Gaume et al. | 428/43 |
| 2005/0258135 A1 | 11/2005 | Ishikawa et al. | |
| 2006/0042433 A1 | 3/2006 | Maekawa et al. | |
| 2006/0137505 A1 | 6/2006 | Wakayama | |
| 2007/0151962 A1 | 7/2007 | Doll et al. | |
| 2008/0217311 A1 | 9/2008 | Eberhardt et al. | |
| 2008/0264994 A1 | 10/2008 | Herve et al. | |
| 2008/0311817 A1 * | 12/2008 | Kawamoto | C03B 33/023 445/24 |
| 2009/0156081 A1 | 6/2009 | Kirihara et al. | |
| 2009/0201444 A1 * | 8/2009 | Yamabuchi | C03B 33/033 349/73 |
| 2009/0262092 A1 | 10/2009 | Halsey, IV et al. | |
| 2010/0119846 A1 | 5/2010 | Sawada | |
| 2010/0170558 A1 | 7/2010 | Stein | |
| 2010/0210442 A1 | 8/2010 | Abramov et al. | |
| 2010/0272134 A1 | 10/2010 | Blanding et al. | |
| 2011/0017713 A1 | 1/2011 | Abramov et al. | |
| 2011/0049765 A1 | 3/2011 | Li et al. | |
| 2011/0127242 A1 | 6/2011 | Li | |
| 2011/0183116 A1 | 7/2011 | Hung et al. | |
| 2011/0226832 A1 | 9/2011 | Bayne et al. | |
| 2012/0011981 A1 * | 1/2012 | Brown | 83/880 |
| 2012/0012632 A1 * | 1/2012 | Tominaga et al. | 225/2 |
| 2012/0329525 A1 | 12/2012 | Hashimoto et al. | |
| 2013/0224439 A1 | 8/2013 | Zhang et al. | |

FOREIGN PATENT DOCUMENTS

| | | |
|---|---|---|
| CN | 1532158 A | 9/2004 |
| CN | 1930097 | 3/2007 |
| CN | 101544029 | 9/2009 |
| CN | 101544029 A | 9/2009 |
| CN | 101579854 A | 11/2009 |
| CN | 101605840 A | 12/2009 |
| CN | 101687686 A | 3/2010 |
| CN | 101962262 A | 2/2011 |
| CN | 201890842 U | 7/2011 |
| EP | 1491309 A1 | 12/2004 |
| GB | 2165174 | 4/1986 |
| JP | 2000247671 A | 9/2000 |
| JP | 2004 083378 * | 3/2001 |
| JP | 2001255504 | 9/2001 |
| JP | 2001255504 A | 9/2001 |
| JP | 2002167230 A | 6/2002 |
| JP | 2002308637 A | 10/2002 |
| JP | 2003292332 | 10/2003 |
| JP | 2003292332 A | 10/2003 |
| JP | 2004-083378 * | 3/2004 |
| JP | 2004083378 A | 3/2004 |
| JP | 2008007384 | 1/2008 |
| JP | 2008007384 A | 1/2008 |
| JP | 2008-247732 * | 10/2008 |
| JP | 2008247732 | 10/2008 |
| JP | 2011026193 | 2/2011 |
| KR | 20050016393 A | 2/2005 |
| KR | 1020050016393 | 2/2005 |
| KR | 20110009639 | 1/2011 |
| TW | 200902467 | 1/2009 |
| TW | 201107257 | 3/2011 |
| TW | 201127763 A1 | 8/2011 |
| WO | 2007094348 A1 | 8/2007 |
| WO | 2008100331 | 8/2008 |
| WO | 2008133800 | 11/2008 |
| WO | 2011084561 | 7/2011 |
| WO | 2011116165 | 9/2011 |

OTHER PUBLICATIONS

B. R. Lawn and D. B. Marshall, "Compact Fracture Resistance of Physically and Chemically Tempered Glass Plates: A V Theoretical Model", Feb. 1977, Physics and Chemistry of Glasses, vol. 18, No. 1, pp. 7-18.*

Lema, Parma. "The Glass Chemical Tempering Process" May 1, 2005, http://www.allbusiness.com/nonmetallic-mineral/glass-glass-manufacturing/468622-1.html.*

Corning Incoporated, "Corning Gorilla Glass," Aug. 2008, http://pdf.directindustry.com/pdf/corning/gorilla- glass- product- information- sheet/12631- 67069- _2.html.*

Glass Basics: Scoring and Separating Recommendations, Technical Information Paper, Corning Disply Technologies, copyright 2004, available at (Jan. 15, 2015): http://pdf.directindustry.com/pdf/corning-display-technologies/glass-basics-scoring-separating-recommendations/57416-562792.html.*

Kopchekchi, L.G., and Shitova, L.A., Dependence of the Crack Depth on Glass Cutting Speed, Glass and Ceramics, vol. 56, Nos. 7-8, 1999.*

Ono, Toshihiko, and Tanaka, Kohichi, Effective of Scribing Wheel Dimensions on the Cutting of AMLCD Glass Substrates, Technical Information Paper, Corning, pp. 1-9, avaiable at http://www.corning.com/media/worldwide/cdt/documents/TIP_306.pdf on Sep. 9, 2016.*

International Search Report and Written Opinion; PCT/US2011/043510 filed Jul. 11, 2011; ISR dated Jun. 10, 2011.

International Search Report and Written Opinion; PCT/US2011/028777 filed Mar. 11, 2011; ISR dated Jul. 21, 2011.

European Patent Office Communication pursuant to Rules 161(1) and 162 EPC; EP Application No. 11738888.4.

Office Action dated Feb. 14, 2014 filed in European Patent Application No. 11711203.7.

International Search Report & Written Opinion in PCT/US2013/041591 filed May 17, 2013; ISR dated Aug. 21, 2013.

Taiwan Notice of Allowance dated May 28, 2015 relating to Taiwan Patent Application No. 100108613.

Taiwan 1st Office Action & Search Report dated Jan. 28, 2015 relating to TW Patent Application No. 100108613.

JP 2nd Office Action dated Sep. 15, 2015 relating to JP Patent Application No. 2013-501319.

Chinese Office Action filed in Patent Application No. 201180014471.2 dated Jul. 2, 2014.

Office Action dated Apr. 9, 2014 filed in U.S. Appl. No. 13/935,085.

Petition Submitted by Third Party in corresponding Japanese Application, dated Aug. 26, 2014.

Final Office Action dated Aug. 15, 2016 for U.S. Appl. No. 13/477,391, filed May 22, 2012.

(56) References Cited

OTHER PUBLICATIONS

English Translation of Chinese first office action dated May 30, 2016 for CN Patent Application No. 201380035076.1.
Office Action dated Mar. 21, 2017 filed in Chinese Patent Application No. 201510500387.1.
Office Action dated Jan. 13, 2017 filed in Korean Patent Application No. 2012-7027320.

* cited by examiner

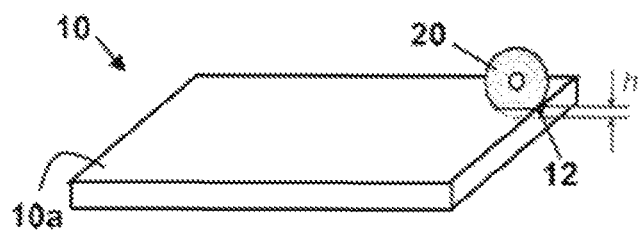
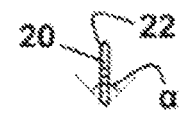
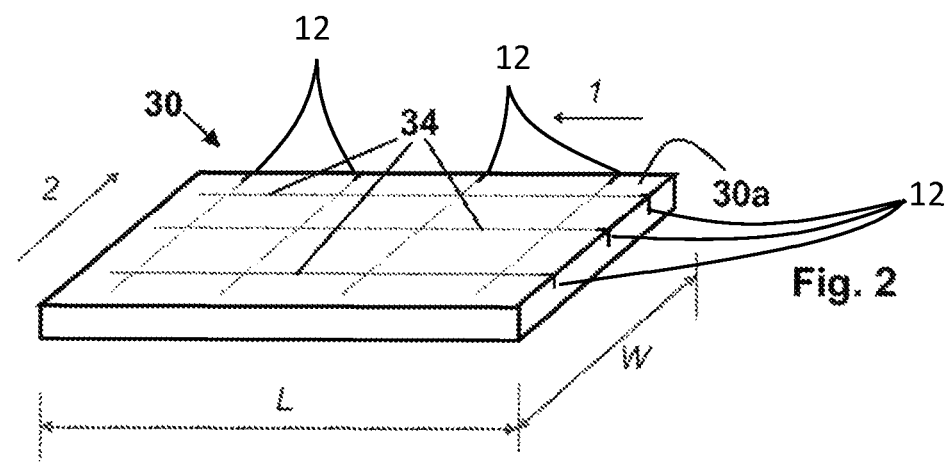
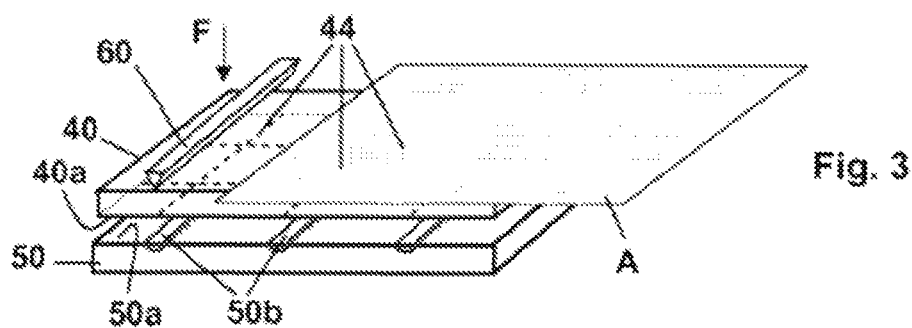

MECHANICAL SCORING AND SEPARATION OF STRENGTHENED GLASS

CROSS-REFERENCE TO RELATED APPLICATIONS

This application claims the benefit of priority under 35 U.S.C. §119(e) of U.S. Provisional Application Ser. No. 61/315,491 filed on Mar. 19, 2010.

BACKGROUND

Field

The present disclosure relates generally to methods for cutting and separating strengthened glass sheets into smaller sheet segments, and more specifically to methods for mechanical cutting and separating strengthened glass substrates without inducing undesired sheet breakage.

Technical Background

Chemically strengthened glass sheet has been used in a wide range of applications including protective cover glasses for consumer electronic devices. The ion-exchange process used for chemical strengthening creates a layer of compressive stress on glass surfaces that provides the desired increase in surface damage resistance, but at the same time results in a tensile stress in the mid-section across the thickness of glass.

To obtain chemically strengthened glass sheet components in accordance with current practice, the components are first cut as sheet segments from non-strengthened (non-ion exchanged) glass sheet into the final shape for the desired component, with finishing of the segment edges and shapes to meet aesthetic and functional objectives. Thereafter the glass components go through the ion-exchange strengthening process by immersing the sheet segments into an ion-exchange bath at an optimum elevated temperature and for a time sufficient to develop an engineered stress profile across glass thickness that provides the required surface strengthening effect. Thereafter the components are removed from the bath and cleaned for further processing.

As the applications for chemically strengthened glass widen to cover emerging technologies, such as devices with integrated touch screens, display manufacturers require the ion-exchanged glass to be supplied in larger sheets of glass, for subsequent cutting into the various sizes and shapes of the final components. To reduce the number of components used to support the functionality of touch screen devices, and to lower manufacturing costs, it is increasingly required that the cutting and separation process steps for medium-to-large-size glass panels be conducted on panels previously subjected to ion-exchange strengthening.

Currently available mechanical methods and processes for cutting glass sheet, including thin drawn glass sheet of the kind used for small and large information display panels, have not yet been successfully adapted to the cutting of ion-exchange-strengthened glass without causing glass cracking, due to the relatively high frangibility of many chemically strengthened glasses. Thus increased attention is presently being focused on specialized processes, such as water-jet cutting and the so-called "wet-etching" processes, to enable the efficient cutting and separation of chemically strengthened glasses. Many of these procedures are time-consuming and expensive, however, so there remains a need for an economical yet effective method for separating relatively frangible chemically strengthened glass sheet into sheet segments of predetermined sizes and shapes.

SUMMARY

In accordance with the present disclosure, methods for the cutting and separation of large-sheet chemically strengthened glass into smaller strengthened sheet segments of predetermined size and shape are provided. Economical mechanical scoring process parameters, in combination with improved separation techniques, can secure clean sheet separation even in thin glass sheets incorporating high levels of compressive surface stress. Further, the disclosed methods can readily be adapted for use in presently existing manufacturing environments.

In a first aspect, therefore, the disclosure encompasses methods for scribing a strengthened glass sheet without inducing sheet separation or breakage. Those methods comprise, first, forming a crack initiation site in a first surface of the glass sheet, at a location proximate to a first edge of the sheet. The glass sheet is chemically strengthened sheet having a surface compression layer of a given depth (a depth "DOL"), and the crack initiation site formed at the location proximate to the first edge of the sheet comprises a surface indentation extending into the first surface.

Following the formation of the crack initiation site, the first surface is mechanically scored from the crack initiation site toward a second edge of the glass sheet such as the opposite edge of the sheet to scribe a vent line in the surface. For the purpose of the present description a vent line is an indentation line formed in the sheet surface that opens that surface to a certain depth. In accordance with the present methods the vent line extends into the first surface of the sheet to a vent depth at least equal to the depth DOL, but less than a fracture depth, i.e., a depth causing a spontaneous and complete separation of the glass sheet into sheet segments or other pieces.

In a second aspect the disclosure provides methods for separating chemically strengthened glass sheet incorporating surface compression layers into two or more sheet segments. Those methods utilize vent lines provided in accordance with the foregoing description and/or by other suitable procedures. In accordance with those methods a vent line is first provided on a first surface of the sheet, that vent line extending into the surface to a vent depth at least equal to the depth of the surface compression layer (e.g., a depth DOL), but less than a fracture depth causing separation of the glass sheet. Thereafter a uniform bending moment is applied across the vent line on the first surface, the bending moment being of a sufficient magnitude (i.e., generating sufficient surface stress) to separate the glass sheet into glass segments along the vent line. A fracture initiation site or sites such as above described may be provided at vent line ends to improve separation efficiency if desired.

BRIEF DESCRIPTION OF THE DRAWINGS

Other aspects of the presently disclosed methods are described below, in part with reference to the appended drawings wherein:

FIG. 1 and FIG. 1a schematically illustrate the mechanical formation of a crack initiation site proximate to the edge of a chemically strengthened glass sheet;

FIG. 2 illustrates an arrangement of criss-crossing vent lines for separating a strengthened glass sheet into multiple sheet segments;

FIG. 3 illustrates an arrangement for a glass sheet separation assembly including a compliant supporting sheet for applying 3-point bending stress to a scribed glass sheet supported thereon;

DETAILED DESCRIPTION

Figure 4:
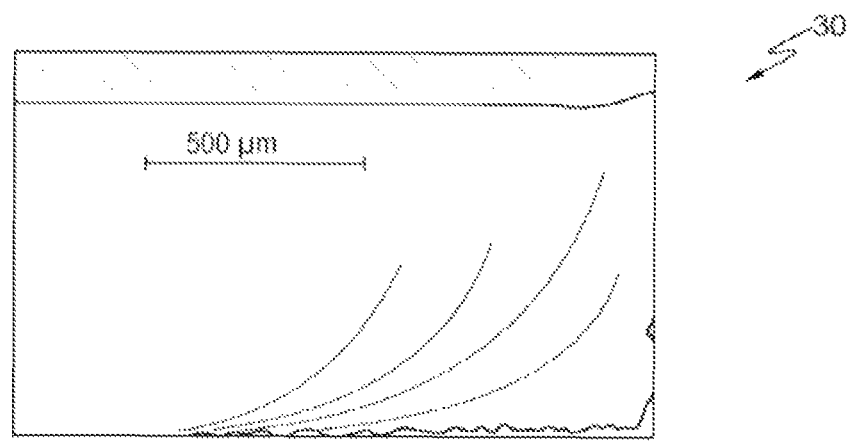
FIG. 4 is a schematic representation of an elevational view of a section of a fracture surface of a glass sheet segment produced in accordance with the methods of the present disclosure, FIG. 5 compares the separation efficiencies of the disclosed methods as a function of selected process variables.

Although the methods disclosed herein are generally applicable to the segmentation of a wide variety of sheet glass articles and materials into smaller sheet glass segments, particular embodiments of those methods as hereinafter more fully described incorporate processing steps bounded by particular ranges of parameters that are especially effective for the scribing and segmenting highly strengthened and toughened glasses such as are presently demanded for information displays to be subjected to severe conditions of use. Thus the following descriptions and illustrative examples are particularly directed to such embodiments even though the practice of the disclosed methods is not limited thereto.

Chemically strengthened glass sheets are essentially glass substrates incorporating engineered stress profiles across their thicknesses, with surface portions of the sheets being brought to high levels of compressive stress, and interior portions into tensile stress, in the course of chemical strengthening. Glass sheets having thicknesses not exceeding 1.5 mm, when comprising surface compression layers exhibiting a peak compressive stress in the range of 400-900 MPa and a depth of compression layer (DOL) in the range of 5-100 μm, are typical of the sheets being employed for information display applications. Thus they comprise an important category of technical materials for which the presently disclosed methods of sheet separation offer particular economic and technical advantages.

The scoring of such sheets utilizing techniques developed for the separation of large glass sheets such as used for LCD display substrates typically leads to glass cracking. According to theory, when a scoring force is applied to an ion-exchange-strengthened glass article that is adequate to overcome the surface compressive stress and initiate median cracking into the tensilely stressed interior of the article, the crack simply propagates uncontrollably to cause spontaneous breakage of the article.

In accordance with selected embodiments of the disclosed methods, however, an abrasive scoring wheel with an appropriately selected geometry is used to initiate controlled mechanical damage that can overcome the residual surface compressive stress without undesired sheet separation or breakage. In particular embodiments a 2 mm-diameter diamond scribing wheel with a suitably tapered circumferential scoring edge can be used for the purpose. As a particular example, a scribing wheel with an edge taper angle in the range of 90-140°, or even 110-115°, can effect the successful scribing of a non-crack-propagating vent line in a 1.1 mm thick sheet of ion-exchanged glass having a maximum (outer surface) compressive stress in the range of 400-900 MPa, particularly in cases where the compressively stressed surface layers have layer depths (DOL) in the range of 5-100 μm. These wheel taper angles can provide median crack depths (vent depths) equal to as much as 10-20% of glass thickness without causing self-separation of the glass sheet during the scribing process.

The selection of any particular wheel taper angle within these ranges can be guided by the particular scoring speed and scoring wheel force (stress level against the glass surface) selected for vent line scoring. As illustrative embodiments of suitable scoring parameters, scoring speeds in the range of 50-500 mm/s and scribing loads in the range of 10-30N, e.g., a scoring speed of 150 mm/s and a scribing load in the range of 18-21 N, can be used.

In accordance with selected embodiments of the disclosed methods, however, an abrasive scoring wheel with an appropriately selected geometry is used to initiate controlled mechanical damage that can overcome the residual surface compressive stress without undesired sheet separation or breakage. In particular embodiments a 2 mm-diameter diamond scribing wheel with a suitably tapered circumferential scoring edge can be used for the purpose. As a particular example, a scribing wheel with an edge taper angle in the range of 90-140°, or even 110-115°, can effect the successful scribing of a non-crack-propagating vent line in a 1.1 mm thick sheet of ion-exchanged glass having a maximum (outer surface) compressive stress in the range of 400-900 MPa, particularly in cases where the compressively stressed surface layers have layer depths (DOL) in the range of 5-100 μm and the level of central tension (CT) is less than 50 MPa. These wheel taper angles can provide median crack depths (vent depths) equal to as much as 10-20% of glass thickness without causing self-separation of the glass sheet during the scribing process.

Figure 6:
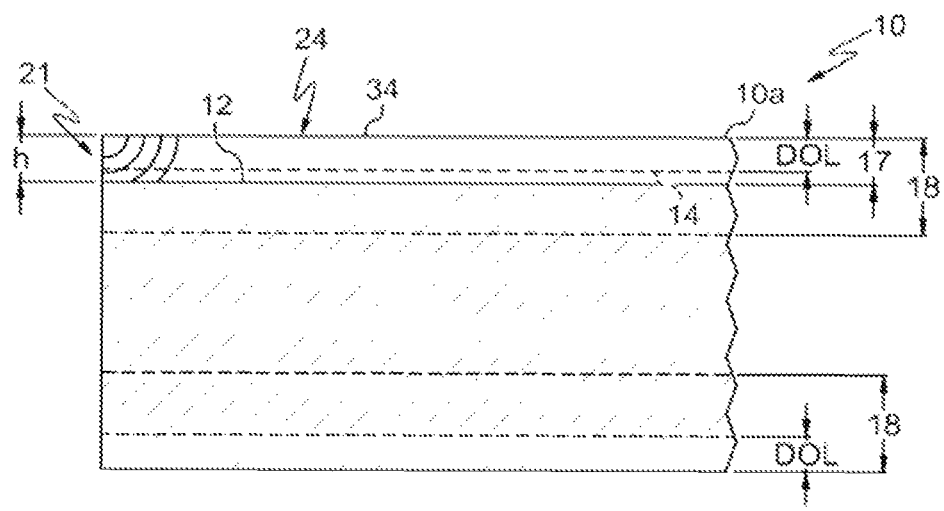
FIG. 6 schematically illustrates a cross-sectional view of a chemically strengthened glass sheet depicting a crack initiation site and mechanical scoring at a vent line.

As depicted in FIG. 6, suitably configured surface indentations providing effective crack initiation sites 21 can be formed using the same scoring wheels as used to extend the vent lines 24 from those crack initiation sites 21 to opposing edges of the glass sheets 10. Generally such crack initiation sites 21 are created by edge-crushing or edge-scoring the sheets 10 at scoring wheel heights set to produce surface indentations of a depth (h) that is less than about 10% of the glass sheet thickness in depth. Close control over the vertical height difference between the tapered wheel edge and the surface 10a of the glass sheet 10 is needed to control this indentation depth h.

In particular embodiments, indentation depths (h) will fall in the range DOL≤h≤3DOL, where DOL is the depth of the surface compression layer 14 provided on the strengthened glass sheet 10. In that range the indentations need to extend only a short distance inwardly from the edges of the sheets 10.

Also useful in controlling the level of edge and surface damage at crack initiation sites 21 is the use of relatively low scribing speeds. Thus to avoid excessive crack propagation from those sites 21 that could cause spontaneous sheet cracking or sheet separation in the course scribing vent lines 34 in the sheets 10, crack initiation scribing speeds will generally be lower in mm/sec than the scribing speed employed for vent line scoring. The size and shape of the resulting surface indentations can vary, but indentation shapes in the form of "half-penny" or "semi-circular" flaws that are absent radial cracks extending from the indentations provide good results under most scribing and separating conditions.

FIGS. 1 and 1a of the drawings schematically illustrate the step of providing a crack initiation site proximate to the edge of a chemically strengthened glass sheet 10 in accordance with the disclosed methods. As shown in FIG. 1, a surface indentation 12 of a depth (h) forming a suitable crack initiation site is cut into the edge and top surface 10a of the sheet using a rotating abrasive scoring wheel 20. The wheel employed for the purpose has a tapered circumferential cutting edge 22 with a taper angle α as shown in an edge view of wheel 20 presented in FIG. 1a. Wheel 20 or a similar scoring wheel can also be used to scribe vent lines of predetermined depth extending from similar crack initiation sites across the top surface of a glass sheet such as sheet 20 utilizing, for example, a scoring wheel having a cutting edge taper angle α, a scoring speed, and a scribing load such as hereinabove described.

As depicted in FIG. 6, the disclosed mechanical scoring methods include particular embodiments wherein a plurality of vent lines 34 extending from a plurality of crack initiation sites 21 are scribed in the first surface 10a of the glass sheet 10. A vent line 34 is an indentation line formed in the sheet surface (here the top surface 10a of the glass sheet 10) that extends into a partial thickness of the glass sheet 10, thereby opening that top surface 10a to a certain depth 17. In accordance with the present methods, the vent line 34 extends into the top surface 10a of the sheet 10 to a vent depth 17 at least equal to the depth DOL of the surface compression layer 14, but less than a fracture depth 18, i.e., a depth causing a spontaneous and complete separation of the glass sheet 10 into sheet segments or other pieces. Mechanical scoring of the top surface 10a of the glass sheet 10 to a depth greater than the fracture depth 18 tends to cause a spontaneous and complete separation of the glass sheet 10 into sheet segments or other pieces. Such self-separation is generally undesired. In some embodiments according to the present disclosure, at least one vent line 34 crosses at least one other vent line 34 in the top surface 10a of the sheet 10. Such an embodiment is depicted in FIG. 2. In the case of criss-crossing vent lines or otherwise, one useful approach is to align the initial scribing direction across the longer dimension of the glass sheet, and to form the crossing vent lines across the shorter dimension of the sheet. Thus where the glass sheet has a width W and a length L that is greater than the width W, the step of mechanical scoring can comprise first scribing a plurality of spaced vent lines from a plurality of crack initiation sites along directions parallel to the length L. Subsequent mechanical scoring then comprises cross-scribing one or more vent lines from similar crack initiation sites in a direction parallel to the sheet width W.

FIG. 2 of the drawings schematically illustrates a chemically strengthened glass sheet 30 wherein a plurality of vent lines 34 extending from a plurality of crack initiation sites have been scribed into sheet top surface 30a. The configuration of sheet 30 is such that sheet length L is greater than sheet width W. In the scribing of criss-crossing vent lines 34 in such sheets according to particular embodiments of the disclosed scribing methods, mechanical scoring is advantageously first conducted in direction 1 to form vent lines parallel to length L of the sheet. The cross-scribing of the remaining vent lines is thereafter carried out by mechanical scoring in direction 2 lying parallel to width W of the sheet. A high level of cross-cut corner and segment edge quality is secured in glass segments separated from the sheet utilizing this particular cross-scribing approach.

For the purpose of separating scribed sheets of chemically strengthened glass into strengthened sheet segments, mechanical breaker apparatus rather than hand breaking is employed. In general, hand breaking cannot generate bending stresses that are sufficiently uniform along the lengths and across the widths of the scribed sheets to guide crack propagation from one sheet edge to another without risking crack deviation and thus uncontrolled sheet breakage.

Mechanical breaker arms can apply uniform bending moments/separation forces across scribe lines along the entire lengths of those lines. Further, close control over the magnitudes and rates of application of the applied bending/separation forces can be secured through such means. The levels of bending force to be employed for the controlled separation of sheets provided with vent lines as herein described will depend on variables such as the thicknesses and elastic properties of the glass, the stress profiles present across the thicknesses of the strengthened sheets, and the depths and widths of the vent lines. However, the particular bending rates and forces to be selected in any particular case can readily be determined by routine experiment.

The selected bending forces may be applied by cantilever beam bending or by three-point bending, but in all cases are applied in a direction effective to develop tensional stress across the vent lines provided in the glass surface. As examples of particular embodiments of sheet separation methods such as herein described, tensional bending stresses of 10-35 MPa, or in the narrower range of 20-25 MPa, will be used. In three-point bending, the tensional stress is generated through the application of a mechanical force to a second surface of the glass sheet opposite the first surface.

In particular three-point-bending embodiments of the disclosed separation methods, the scribed sheets are supported on a compliant support surface during the application of a mechanical breaking force to the sheets. The sheets are positioned on the supports with the vent lines facing the support surfaces, and mechanical breaking forces are then applied to the sheets on the sheet surfaces opposite the vent lines.

In breaking methods involving 3-point bending against compliant support surfaces, the desired flexure and breakage of the sheets along vent lines is favored by providing surface grooves in the support surfaces. The vent lines in the sheet surface in those embodiments are positioned over and in alignment with the grooves in the support surfaces to facilitate sheet deflection during the application of the mechanical force.

FIG. 3 of the drawings presents a schematic exploded view of an arrangement for securing sheet separation via breakage in three-point bending utilizing a compliant support surface such as described. As shown in FIG. 3, a glass sheet 40 comprising a plurality of criss-crossing vent lines 44 on bottom surface 40a of the sheet is positioned over a support member 50 comprising a compliant support surface 50a. Support surface 50a incorporates an array of grooves 50b with a groove spacing corresponding to the spacing of a subset of vent lines 44 on the bottom surface of glass sheet 40. A breaker bar 60 is positioned above the upper surface of glass sheet 40 and in alignment with both leftmost vent line 44 in bottom surface 40a of glass sheet 40 and leftmost groove 50b in compliant support surface 50a.

When the elements of the illustrated assembly are brought into contact with each other, the breaker bar can effect separation of glass sheet 40 along leftmost vent line 44 through the application of a downward force F to the top surface of sheet 40. That force creates tensional stress across leftmost vent line 44 through the flexure of sheet 40 downwardly into groove 50b of compliant support member 50, resulting in sheet separation caused by three-point bending of the sheet. In some embodiments, those portions of the cross-vented glass sheet 40 not being subjected to downward force by breaker bar 60 can be stabilized through the application of a uniform clamping pressure broadly applied to glass sheet 40 and underlying compliant support member 50 over the clamping area indicated as area A in FIG. 3.

Variations in processing parameters and equipment specifications useful in the practice of selected embodiments of the disclosed methods are presented in the following illustrative descriptions. One consideration affecting scribing effectiveness in some cases relates to the choice of rotating abrasive scoring wheels for forming the scribed vent lines. Steeper wheel taper angles, e.g., taper angles in the range of 110-125° can be effectively employed with wheels of relatively small diameter, i.e., diameters in the 2-4 mm range. Ground abrasive wheel surfaces, as opposed to surfaces that have been finished by polishing, are particularly suitable for the scribing of highly compressed glass surfaces, and are commercially available. Suitable materials for fashioning abrasive scoring wheels or other scoring implements include tungsten carbide and diamond, the latter including either single crystal or polycrystalline diamond (PCD). Scoring wheel surface finishes in the range of 0.25 µm (+/−0.15 µm) as measured by Zygo white light interferometer provide good results.

The use of such wheels in combination with appropriately selected scoring speeds and scribing loads help to prevent full-body sheet separation during the scribing process, and to minimize surface chipping adjacent separated surfaces. The use of a computer controlled vision system to position the strengthened sheets on scribing tables is helpful to insure proper sheet alignment and vent line registration and spacing.

As noted above, scribing loads and speeds suitable for producing vent lines with median crack depths in the range of 10-20% of glass thickness are generally effective both to avoid sheet separation during scribing and to secure consistent sheet separation under subsequently applied bending stresses. For the purpose of achieving good control over vent line depth it is generally found that increases in scribing speed that are offset by increases in scribe load can produce equivalent ranges of median crack depth.

Table 1 below provides one illustration of this effect. Included in that Table are data covering a particular range of scribing speeds and loads, including an indication in each case as to the effectiveness of each set of scribing conditions for achieving controlled rather than spontaneous sheet separation. The data in Table 1 are representative of results generated during the scribing of ion-exchange strengthened glass sheet of 1.1 mm thickness having a peak compressive surface stress level in the range of 600-750 MPa, a peak central tension level of less than 40 Mpa, and a depth of surface compression layer in the range of 25-40 µm. Scribing conditions yielding stable criss-crossing vent lines are identified by an XC indicator, while conditions yielding stable parallel vent lines are identified by S indicator. Conditions resulting in an undesirable level of sheet separation during scribing are identified by an FS indicator in the Table.

TABLE 1

Scribing Process Conditions

| Scribe Speed (mm/s) | Scribe Load (N) | | | | |
|---|---|---|---|---|---|
| | 14 | 18 | 21 | 24 | 28 |
| 65 | | XC | FS | | |
| 125 | S | XC | XC | FS | |
| 255 | | | S | XC | FS |

Of course, the scribing conditions most effective to generate vent lines without spontaneous sheet separation and/or excessive surface damage in any particular case will depend on glass thickness as well as on the particular engineered stress profile developed across the thickness of the strengthened sheet in the course of chemical strengthening. In particular illustrative embodiments of the disclosed methods, ion-exchange strengthened glass sheet of 1.1 mm thickness having a peak compressive surface stress level in the range of 400-850 MPa, a peak central tension level not exceeding 40 Mpa, and depth of compressive layer in the range of 10-70 µm can be effectively scribed within a scribe load range of 14-24N and a scribing speed of 50-750 mm/s. Scribing within a scribe load range of 16-21 N at scribing speeds in the range of 125-250 mm/s can produce median crack depths in the range of 120-180 µm in such glasses, while maintaining lateral crack sizes below 150 µm.

Figure 5:
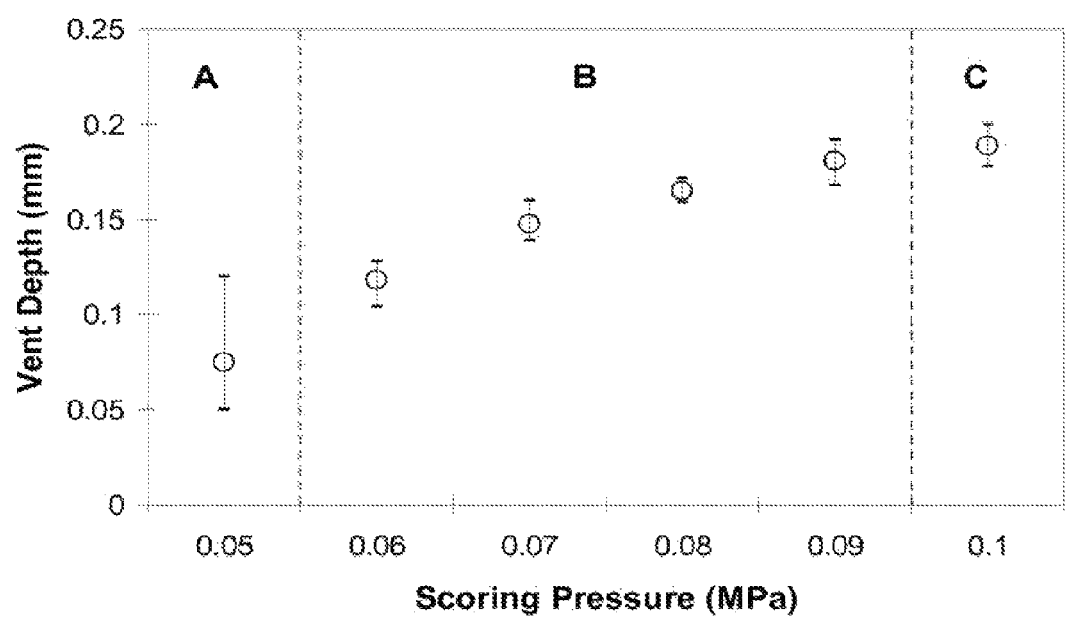

A specific illustrative embodiment of the application of the disclosed sheet separation procedures is provided in FIG. 5 of the drawings. FIG. 5 graphically presents a process window applicable to the scribing and separation of 1.1 mm-thick strengthened glass sheet incorporating a surface compressive stress of 650 MPa, a central tension level of 30 Mpa, and depth of compressive layer of 46 µm. The scribing loads employed during the processing of this sheet are reported as scoring pressures in MPa on the horizontal axis of the graph, while the resulting vent line depths are plotted in mm on the vertical graph axis. The plotted vent depths vary as a function of scribing speed (these being in the range of 250-500 mm/sec for the results shown) as well as on scoring pressure.

Sheet separation effectiveness within the process ranges shown in FIG. 5 falls into one of three regions in the graph, indicated by labels A, B, and C in the field of data. Region A corresponds to a processing region of limited sheet separability, i.e., a region wherein the level of separation without segment breakage or separation edge damage is too high. Region C corresponds to a processing region where the incidence of spontaneous sheet separation during scoring or scored sheet handling is excessive. Thus best results in terms of scored sheet stability and clean sheet separation for strengthened glass sheet of this particular thickness and stress profile are secured by confining processing conditions to those falling within Region B of the graph.

The effective separation of strengthened glass sheet segments from appropriately scribed glass sheets of larger dimensions depends in part on the application of bending moments to the scored sheets that generate tensional breaking stresses in a suitable stress range. In typical embodiments of the sheet separation methods disclosed herein, tensional stresses in the range of about 10-35 MPa are effective to provide consistent sheet separation over a relatively wide range of sheet thicknesses and vent line depths. Thus, for ion-exchange-strengthened sheets of 1.1 mm thickness, applied tensional stresses in the range of 20-30 MPa across the vent lines are effective.

The selection of appropriate stress levels for achieving consistent sheet separation in three-point bending against a compliant supporting surface will depend in part on the presence and configuration of surface grooves in the surface that are aligned with the vent lines in the strengthened sheets. Suitable ranges of groove depth can be estimated utilizing the following formula relating deflection δ of a glass sheet of thickness t resulting from the application of an applied bending stress $\sigma_f$ where the strengthened glass has an elastic modulus E:

$$\delta = \frac{\sigma_f L^2}{6Et}$$

Table 2 below presents calculated sheet deflections that would result from the application of two levels of bending stress to strengthened glass sheet of three different thicknesses. Bending or breaking stresses are reported in MPa, glass sheet thicknesses in mm, and the sheet deflection at each given sheet thickness and bending stress in μm. Utilizing a compliant support material such as a silicone elastomer to provide compliant supporting surface for effecting scribed sheet separation in three-point bending, it can be calculated that a groove depth greater than 2 mm in combination with a groove width greater than 200 μm can accommodate sheet deflections greater than 1.1 mm.

TABLE 2

Glass Sheet Deflections

| Breaking Stress (MPa) | Glass Thickness (mm) | | |
|---|---|---|---|
| | 0.55 | 0.7 | 1.1 |
| 15 | 60 | 50 | 30 |
| 25 | 110 | 80 | 50 |

The consistency of sheet separation under cantilever or three-point bending can also be affected by the rate at which the bending forces are applied to the glass. The selection of a suitable separation speed will depend on sheet thickness and on the level of separation force to be applied, with thicker and stiffer glass sheet benefiting from higher force levels applied at lower speeds, and thinner, more flexible sheet benefiting from the application of lower bending forces at higher speeds. As an illustrative example, the separation of a chemically strengthened glass sheet of a thickness below 1.5 mm having a compressive surface stress in the range of 400-850 MPa and a scribed vent depth in the range of 100-225 μm can generally be effected at an applied stress in the range of 10-35 MPa. Where the applied stress is to be generated via an advancing breaker bar under cantilever beam loading, consistent sheet separation can be achieved at bar advance rates in excess of 0.02 inches/min at a moment arm length or bar offset of between 3-10 mm between the breaker bar contact line and the vent line.

An illustrative embodiment of strengthened glass sheet separation utilizing embodiments of the methods hereinabove described is shown in the following non-limiting example.

EXAMPLE

Two strengthened glass sheet types are selected for processing. Both samples comprise Corning Gorilla® Glass sheet of 1.1 mm sheet thickness. One sheet sample incorporates surface compression layers of 30 μm thickness and a surface compressive stress level of 750 MPa, with a calculated sheet center tension of 33 MPa. The other sheet incorporates surface compression layers of 36 μm thickness and a surface compressive stress level of 625 MPa, also with a calculated sheet center tension of 33 MPa.

Sheets of these two glasses, each 370 mm by 470 mm in size are selected for sectioning into four equally sized smaller sheet segments, each segment to be 135 mm×235 mm in size. For that purpose each sheet is mechanically scribed in accordance with the procedure below utilizing a commercial abrasive glass cutting machine, i.e., a Gen-3 TLC Phoenix-600® glass cutting machine commercially obtained from TLC International, Phoenix, Ariz., USA. The abrasive cutting wheel used for scoring the surfaces of the glass sheets is a DCW-TX 2.0×0.65×0.8×110° A140 tapered cutting wheel of taper angle 110°.

Figure 7A:
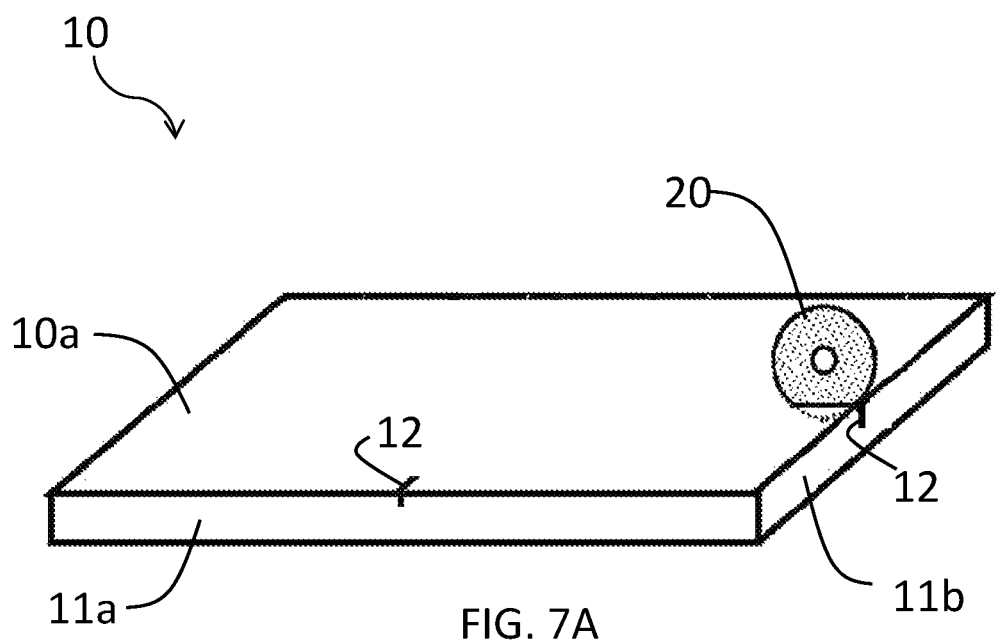
FIG. 7A schematically illustrates crack initiation sites formed in adjacent edges of chemically strengthened glass sheet.
Figure 7B:
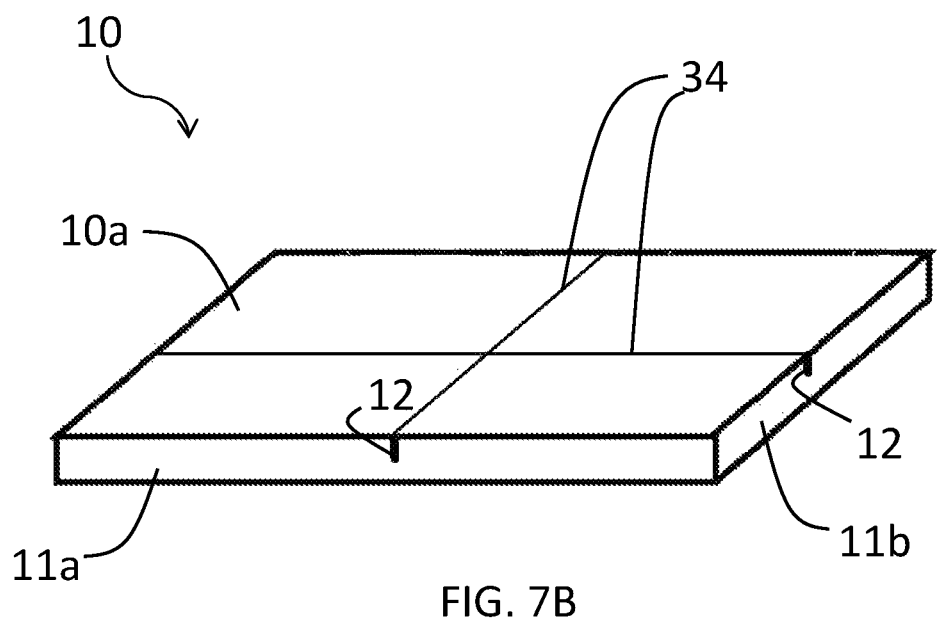
FIG. 7B schematically illustrates crossing vent lines formed from the crack initiation sites schematically illustrated in FIG. 7A.

As shown in FIG. 7A, to provide crack initiation sites 12 in each of the glass sheets, the edges 11a, 11b of the sheets are first "edge-crushed" by offsetting the abrasive scoring wheel position to a level 0.0035 inches or 90 μm below the level of the glass sheet surfaces. Referring to FIG. 7B, crossing vent lines 34 extending from the crack initiation sites 12 and suitable for dividing each sheet into four smaller segments are then scribed into the surfaces of each of the sheets. Scribing is carried out under a scribing pressure in the range of about 0.11-0.13 MPa, corresponding to a measured force in the range of 16-20 N on the scoring wheel. The targeted vent depth for both sheets is in the range of 140-175 μm. As shown in the embodiment depicted in FIG. 2, it is possible to divide a glass sheet into more than four segments by having more than one vent line extending from an edge.

The scribing speeds employed are 250 mm/s for the sheet with the 30 μm compression layer depth and 125 mm/s for the sheet with the 36 μm compression layer depth. The first scribe direction is parallel to the long dimension of each sheet and the second or crossing scribe direction is parallel to the short dimension of each sheet.

Following the machining of crossing vent lines in each of the sheets, each sheet is successfully separated into four sheet segments of smaller size by the application of a uniform breaking force across the vent lines in each sheet utilizing a mechanical breaker bar. A breaking stress in the range of 25-35 MPa is sufficient to achieve sheet separation along each of the vent lines.

Sheets of the same glass composition, but of reduced (0.7 mm) thickness and incorporating thinner surface compression layers, are also successfully cross-vented utilizing the same glass cutting equipment as described above, but at scoring speeds in the range of 250-500 mm/s. Additionally, utilizing Gen-5 glass cutting equipment from the same manufacturer, successful cross-scribing and sheet separation are accomplished without edge-crushing the sheets to provide the required crack initiation sites. In that procedure, suitable crack initiation sites are formed proximate to the edges of the larger sheets by utilizing slow abrasive wheel set-down velocities and light wheel scribing loads at wheel set-down locations greater than 5 mm from the edges of the larger glass sheets.

FIG. 4 of the drawings is a schematic representation of an elevational side view of a section of a fracture surface formed upon the separation a chemically strengthened glass sheet segment from a larger sheet of chemically strengthened glass in accordance with the methods hereinabove set forth. The horizontal bar in the field of the fracture surface represents a dimension of 500 μm. The vent line giving rise to the stress fracture that produced the clean separation surface shown in FIG. 4 appears as a bordering band along the upper edge of that surface.

The foregoing descriptions and examples demonstrate that chemically strengthened glass sheet may be successfully segmented into smaller strengthened sheets of any required size and shape, even using existing mechanical scribing systems, provided that procedures effective to overcome the glass breakage problems presented by the high sheet stress levels and frangibility of chemically strengthened glass sheets are appropriately applied. Of course, those examples and descriptions are merely illustrative of the range of scribing and separation procedures that may successfully be adapted for the purpose of processing large sheets of chemically strengthened glass within the scope of the appended claims.

What is claimed is:

1. A method for scribing a chemically strengthened glass sheet comprising the steps of:
   forming a plurality of crack initiation sites in a first surface and proximate to a first edge of a chemically strengthened glass sheet using a first rotating abrasive scoring wheel, the chemically strengthened glass sheet comprising a surface compression layer of layer depth DOL and each crack initiation site comprising a surface indentation extending into the first surface; and
   following the formation of the plurality of crack initiation sites, mechanically scoring the first surface from the plurality of crack initiation sites toward a second edge of the chemically strengthened glass sheet to scribe a plurality of vent lines that extend along the first surface and into the chemically strengthened glass sheet to a vent depth at least equal to DOL but less than a fracture depth without causing self-separation of the chemically strengthened glass sheet, wherein a vent line extending to the fracture depth would cause self-separation of the chemically strengthened glass sheet.

2. A method in accordance with claim 1 wherein the surface indentation extends into the first surface to a depth h that is greater than DOL but less than 3 times DOL.

3. A method in accordance with claim 1 wherein the chemically strengthened glass sheet has a thickness not exceeding 1.5 mm.

4. A method in accordance with claim 3 wherein the surface compression layer exhibits a peak compressive stress in the range of 400-900 MPa, a peak central tension of less than 50 MPa, and wherein layer depth DOL is in the range of 5-100 µm.

5. A method in accordance with claim 3 wherein the peak central tension does not exceed 40 MPa and the vent depth is the range of about 10-20% of the thickness of the chemically strengthened glass sheet.

6. A method in accordance with claim 3 wherein the surface indentation extends into the first surface to a depth that is less than 10% of the thickness of the chemically strengthened glass sheet.

7. A method in accordance with claim 1 wherein at least one vent line crosses at least one other vent line.

8. A method in accordance with claim 1 wherein the chemically strengthened glass sheet has a width W and a length L that is greater than the width W, and wherein mechanical scoring comprises scribing the plurality of spaced vent lines from the plurality of crack initiation sites along directions parallel to the length L.

9. A method in accordance with claim 8 wherein mechanical scoring further comprises cross-scribing at least one vent line from a crack initiation site proximate to a second edge of the chemically strengthened glass sheet across the plurality of spaced vent lines in a direction parallel to the width W.

10. A method in accordance with claim 1 wherein the first rotating abrasive scoring wheel comprises a tapered circumferential cutting edge.

11. A method in accordance with claim 10 wherein the circumferential cutting edge has a taper angle $\alpha$ in the range of 90-140°.

12. A method in accordance with claim 11 wherein mechanical scoring comprises moving the first rotating abrasive scoring wheel with respect to the first surface at a scoring speed in the range of 50-500 mm/s while applying a scribing load in the range of 10N to 30N to the first surface.

13. The method in accordance with claim 1 wherein the vent depth of the vent line is greater than a depth of the surface indentation at the crack initiation site.

14. The method in accordance with claim 1 wherein forming the crack initiation site further comprises forming the surface indentation proximate to the first edge of the chemically strengthened glass sheet with a scoring implement moving at a crack initiation speed, and wherein mechanically scoring the first surface further comprises scoring the first surface toward the second edge of the chemically strengthened glass sheet with the scoring implement moving at a scribing speed that is greater than the crack initiation speed.

15. The method in accordance with claim 1 wherein each crack initiation site of the plurality of crack initiation sites is configured as a surface indentation having a semi-circular shape that does not extend an entire lateral dimension from the first edge of the surface to the second edge of the surface.

16. The method in accordance with claim 1 further comprising:
   prior to mechanically scoring the first surface from the plurality of crack initiation sites, forming a second plurality of crack initiation sites in the first surface and proximate to a third edge of the chemical strengthened glass sheet using the first rotating abrasive scoring wheel; and
   following the formation of the second plurality of crack initiation sites, mechanically scoring the first surface from the second plurality of crack initiation sites toward a fourth edge of the chemically strengthened glass sheet to scribe a second plurality of vent lines that extends along the first surface and into the chemically strengthened glass sheet to a vent depth at least equal to DOL but less than a fracture depth without causing self-separation of the chemically strengthened glass sheet, wherein the plurality of vent lines and the second plurality of vent lines define a plurality of crossing vent lines extending from the plurality of crack initiation sites and the second plurality of crack initiation sites.

17. The method in accordance with claim 1 wherein the plurality of vent lines scribed from the plurality of crack initiation sites is scored using a second rotating abrasive scoring wheel.

18. The method in accordance with claim 16 wherein the plurality of vent lines scribed from the plurality of crack initiation sites and the second plurality of vent lines scribed from the second plurality of crack initiation sites are scored using a second rotating abrasive scoring wheel.

* * * * *